US012798963B2

(12) United States Patent
Burn et al.

(10) Patent No.: US 12,798,963 B2
(45) Date of Patent: Nov. 17, 2026

(54) PROCESS FOR PRODUCING HYDROGEN FROM CO-RICH GASES

(71) Applicant: TOPSOE A/S, Kgs. Lyngby (DK)

(72) Inventors: Jeremy Neil Burn, Tølløse (DK); Raul Montesano Lopez, Kgs. Lyngby (DK); Jens Sehested, Ballerup (DK); Susanne Lægsgaard Jørgensen, Holte (DK); Niels Christian Schjødt, Hvalsø (DK)

(73) Assignee: TOPSOE A/S, Kgs. Lyngby (DK)

( * ) Notice: Subject to any disclaimer, the term of this patent is extended or adjusted under 35 U.S.C. 154(b) by 529 days.

(21) Appl. No.: 18/250,322

(22) PCT Filed: Nov. 24, 2021

(86) PCT No.: PCT/EP2021/082794

§ 371 (c)(1),
(2) Date: Apr. 24, 2023

(87) PCT Pub. No.: WO2022/112311

PCT Pub. Date: Jun. 2, 2022

(65) Prior Publication Data

US 2024/0002224 A1 Jan. 4, 2024

(30) Foreign Application Priority Data

Nov. 24, 2020 (EP) .................................... 20209525
Nov. 24, 2020 (EP) .................................... 20209527
Feb. 26, 2021 (EP) .................................... 21159622

(51) Int. Cl.

*C01B 3/16* (2006.01)
*B01J 21/04* (2006.01)
*B01J 23/00* (2006.01)
*B01J 23/80* (2006.01)
*B01J 35/30* (2024.01)
*B01J 35/31* (2024.01)
*B01J 35/36* (2024.01)
*B01J 35/50* (2024.01)
*B01J 35/63* (2024.01)
*C01B 3/48* (2006.01)

(52) U.S. Cl.

CPC ................. *C01B 3/16* (2013.01); *B01J 21/04* (2013.01); *B01J 23/005* (2013.01); *B01J 23/80* (2013.01); *B01J 35/31* (2024.01); *B01J 35/36* (2024.01); *B01J 35/394* (2024.01); *B01J 35/50* (2024.01); *B01J 35/633* (2024.01); *C01B 3/48* (2013.01); *B01J 2235/00* (2024.01); *C01B 2203/0244* (2013.01); *C01B 2203/025* (2013.01); *C01B 2203/0283* (2013.01); *C01B 2203/1076* (2013.01); *C01B 2203/1082* (2013.01); *C01B 2203/1094* (2013.01); *C01B 2203/1241* (2013.01)

(58) Field of Classification Search

CPC .. C01B 3/16; C01B 3/48; B01J 35/394; B01J 35/36; B01J 35/31; B01J 35/633; B01J 35/50; B01J 21/04; B01J 23/005; B01J 23/80

See application file for complete search history.

(56) References Cited

U.S. PATENT DOCUMENTS

| | | | |
|---|---|---|---|
| 3,850,850 A | 11/1974 | Bruce et al. | |
| 5,008,235 A | 4/1991 | Wegman et al. | |
| 5,142,067 A | 8/1992 | Wegman et al. | |
| 6,455,464 B1 | 9/2002 | Chen | |
| 7,347,978 B2 | 3/2008 | Lomax et al. | |
| 7,510,696 B2 | 3/2009 | Herb et al. | |
| 7,998,897 B2 | 8/2011 | Schioedt | |
| 8,119,099 B2 * | 2/2012 | Schiodt | B01J 23/005 423/655 |
| 8,404,156 B2 | 3/2013 | Schioedt | |
| 9,365,421 B2 | 6/2016 | Hinton et al. | |
| 10,226,760 B2 | 3/2019 | Paulus et al. | |
| 10,549,991 B2 | 2/2020 | Wix et al. | |
| 2003/0003033 A1 | 1/2003 | Taguchi et al. | |
| 2006/0002848 A1 | 1/2006 | Tonkovich et al. | |
| 2006/0188435 A1 | 8/2006 | Herb et al. | |
| 2009/0149324 A1 | 6/2009 | Madon | |
| 2009/0152500 A1 | 6/2009 | Chen et al. | |
| 2010/0000155 A1 | 1/2010 | Schiodt | |
| 2011/0101277 A1 | 5/2011 | Schioedt | |
| 2011/0101279 A1 | 5/2011 | Schioedt | |

(Continued)

FOREIGN PATENT DOCUMENTS

| | | |
|---|---|---|
| CN | 1695802 A | 5/2005 |
| CN | 1883795 A | 12/2006 |

(Continued)

OTHER PUBLICATIONS

Niels C. SchiØdt in view of Guo et al., International J of Hydrogen Energy, (2009), v.34, p. 2361-2368.*
Aasberg-Persen et al., J. of Natural Gas Science and Engineering, (2011), v.3, p. 423-459.*
Wismann et al, Science, (2019), v.364, 756-759.*
Alberto J. Marchi et al. "Liquid phase hydrogenation of cinnamaldehyde on Cu-based catalysts," Applied Catalysis A: General, vol. 249, 2003 pp. 53-67.
International Preliminary Report on Patentability received for PCT Patent Application No. PCT/EP2021/082791, mailed on Jun. 8, 2023, 9 pages.

(Continued)

*Primary Examiner* — Yong L Chu
(74) *Attorney, Agent, or Firm* — Boone IP Law

(57) ABSTRACT

The disclosure relates to a process for enriching a synthesis gas in hydrogen by contacting said synthesis gas with a water gas shift catalyst, the synthesis gas being a CO-rich synthesis gas including at least 15 vol % CO and at least 1 ppmv sulfur, and the water gas shift catalyst including Zn, Al, optionally Cu, and an alkali metal or alkali metal compound; the water gas shift catalyst is free of chromium (Cr) and iron (Fe), and has a pore volume, as determined by mercury intrusion, of 240 ml/kg or higher.

20 Claims, 1 Drawing Sheet

(56) References Cited

U.S. PATENT DOCUMENTS

| | | | |
|---|---|---|---|
| 2013/0028822 A1 | 1/2013 | Bourane et al. |
| 2013/0199968 A1 | 8/2013 | Bourane et al. |
| 2014/0225037 A1 | 8/2014 | Hinton et al. |
| 2017/0148929 A1 | 5/2017 | Iwata et al. |
| 2017/0355601 A1 | 12/2017 | Wix et al. |
| 2018/0305205 A1 | 10/2018 | Carass et al. |
| 2019/0039886 A1 | 2/2019 | Krøll Jensen et al. |
| 2019/0047852 A1 | 2/2019 | Pach et al. |
| 2019/0228797 A1 | 7/2019 | Hashimoto et al. |
| 2020/0354215 A1 | 11/2020 | Alexander et al. |
| 2021/0206634 A1 | 7/2021 | Krøll Jensen et al. |
| 2022/0152597 A1 | 5/2022 | Garcia-Dieguez |

FOREIGN PATENT DOCUMENTS

| | | |
|---|---|---|
| CN | 102125849 A | 7/2011 |
| CN | 104039444 A | 9/2014 |
| CN | 104640806 A | 5/2015 |
| CN | 105107512 A | 12/2015 |
| CN | 105214671 A | 1/2016 |
| CN | 109053369 A | 12/2018 |
| EP | 0011150 A1 | 5/1980 |
| EP | 0721799 A1 | 7/1996 |
| EP | 1256545 A1 | 11/2002 |
| EP | 2300359 B1 | 8/2015 |
| EP | 2237882 B1 | 2/2019 |
| EP | 3368470 B1 | 9/2019 |
| JP | S5570347 A | 5/1980 |
| JP | H08229399 A | 9/1996 |
| JP | 2012183459 A | 9/2012 |
| WO | 2007073385 A1 | 6/2007 |
| WO | 2013072197 A1 | 5/2013 |
| WO | 2014029680 A1 | 2/2014 |
| WO | 2015070298 A1 | 5/2015 |
| WO | 2017072481 A1 | 5/2017 |
| WO | 2017148929 A1 | 9/2017 |
| WO | 2018069759 A1 | 4/2018 |
| WO | 2019228797 A1 | 12/2019 |
| WO | 2020212681 A1 | 10/2020 |

OTHER PUBLICATIONS

International Preliminary Report on Patentability received for PCT Patent Application No. PCT/EP2021/082792, mailed on Jun. 8, 2023, 6 pages.

International Preliminary Report on Patentability received for PCT Patent Application No. PCT/EP2021/082794, mailed on Jun. 8, 2023, 7 pages.

International Preliminary Report on Patentability received for PCT Patent Application No. PCT/EP2021/082821, mailed on Jun. 8, 2023, 10 pages.

M. V. Twigg "Catalyst Handbook", 2nd ed., Manson Publishing Ltd., 1996 (ISBN 1 874545 35 9) section 6.5.3 p. 299.

Lama Omar, "Elaboration of Novel Hybrid ZnO and ZnAl2O4 as Support for Copper Based Catalysts for the Hydrogenolysis of Glycerol to 1,2-Propanediol" submitted in Jan. 2, 2021, by HAL Open Science, 257 pages.

Alberto J. Marchi, "Liquid Phase Hydrogenation of Cinnamaldehyde on Cu-Based Catalysts" dated Sep. 19, 2002, in Science Direct, 15 pages.

Antoniak-Jurak et al., "Zn—AL Mixed Oxides Decorated with Potassium as Catalysts for HT-WGS: Preparation and Properties," Catalysts, 10. 1094, Sep. 21, 2020, 14 pages.

Third Party Observation in European application No. 21816061.2, Mar. 13, 2024, 5 pages.

Notice of Reasons for Refusal for Application No. 2023-530800 issued by the Japanese Office Action dated Oct. 16, 2025, 6 pages.

Chunyou Gao, et al."Preparation of L-Phenylalaninol with High ee Selectivity by Catalytic Hydrogenation of L-Phenylalaninate Over Cu/ZnO/Al2O3 Catalyst," Catalysis Science & Technology, The Royal Society of Chemistry, 2013, pp. 1056-1062.

European Search Report issued in corresponding Application No. EP 20 20 9523 dated Apr. 26, 2021.

European Search Report issued in corresponding Application No. EP 20 20 9525 dated Apr. 30, 2021.

European Search Report issued in corresponding Application No. EP 20 20 9527 dated Apr. 28, 2021.

European Search Report issued in corresponding Application No. EP 21159622 dated Apr. 30, 2021.

International Search Report (PCT/ISA/210) and Written Opinion (PCT/ISA/237) mailed on Apr. 22, 2022, by the European Patent Office as the International Searching Authority for International Application No. PCT/EP2021/082794. (12 pages).

International Search Report (PCT/ISA/210) and Written Opinion (PCT/ISA/237) mailed on Feb. 28, 2022, by the European Patent Office as the International Searching Authority for International Application No. PCT/EP2021/082791. (15 pages).

International Search Report (PCT/ISA/210) and Written Opinion (PCT/ISA/237) mailed on Feb. 28, 2022, by the European Patent Office as the International Searching Authority for International Application No. PCT/EP2021/082792. (12 pages).

International Search Report (PCT/ISA/210) and Written Opinion (PCT/ISA/237) mailed on Mar. 3, 2022, by the European Patent Office as the International Searching Authority for International Application No. PCT/EP2021/082821. (15 pages).

Shi et al., "Effects of the preparation method on the performance of the Cu/ZnO/A12O3 catalyst for the manufacture of L-phenylalaninol with high ee selectivity from L-phenylalanine methylester", Catalysis Science & Technology, vol. 4, Jan. 1, 2014, pp. 1132-1143.

NISTIR 5078 Saturation Table (1995), from related U.S. Appl. No. 18/250,289, 5 pages.

European Patent Office's Communication of a Notice of Opposition for Application No. 21814801.3 dated Aug. 11, 2025, 17 pages.

Martyn V. Twigg "The Water Gas Shift Reaction" Catalyst Handbook, 1997 ISSN: 1874545359, pp. 292-305.

Martyn V. Twigg "Low-temperature Shift" Catalyst Handbook, 1997 ISSN: 1874545359, pp. 308-321.

Ken Chlapik "LTS Safe and Proven Recovery Strategies" AlChemE 57th Annual Safety in Ammonia Plants and Related Facilities Symposium, Sep. 2012.

Program for 2012 AIChE Ammonia Safety Symposium, Sep. 9-13, 2012.

MSDS for Katalco 83-3X, issued May 11, 2019, 18 pages.

Jack Carstensen, "New High-Temperature Shift Catalysts Solve the Fischer-Tropsch Problem" AlChemE 34th Annual Safety in Ammonia Plantsa nd Related Facilities Symposium, AlChemE, vol. 30, 1990, pp. 139-151.

G.F.C. Rogers, "Thermodynamic and Transport Properties of Fluids" Rogers & Mayhew (Eds). 5th Ed, 1995 ISSN: 631 19703 6, p. 4.

Martyn V. Twigg "Specific Heats of Catalysts" Catalyst Handbook, 1997 ISSN: 1 874545 35 9, p. 561.

Robert H. Perry "Specific Heats of Pure Compounds" Chemical Engineers' Handbook, 5th Edition, 1973 ISSN: 0 07 049478 9, pp. 3-119.

* cited by examiner

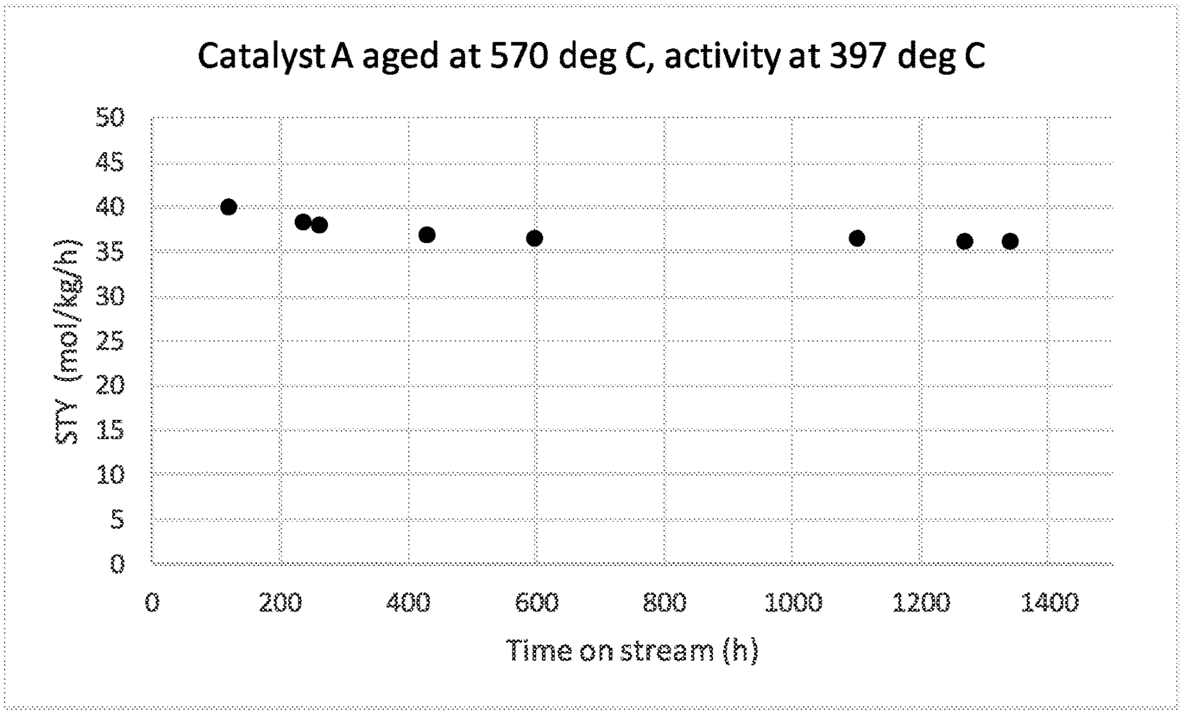
Catalyst A aged at 570 deg C, activity at 397 deg C
STY (mol/kg/h)
50
45
40
35
30
25
20
15
10
5
0
0
200
400
600
800
1000
1200
1400
Time on stream (h)

PROCESS FOR PRODUCING HYDROGEN FROM CO-RICH GASES

FIELD OF THE INVENTION

The present invention relates to a process for enriching a synthesis gas in hydrogen by the water gas shift reaction for the special case of CO-rich gases and with a significant amount of sulfur (S) i.e. a gases comprising at least 15 vol % CO and at least 1 ppmv sulfur, such as 15 ppmv, 250 ppmv, or 5 vol % sulfur, which are particularly demanding for the water gas shift catalyst in terms of e.g. mechanical stability and selectivity. Such CO-rich gases arise from e.g. gasification of waste, biomass or other carbonaceous materials or from e.g. partial oxidation of hydrocarbons. More specifically, the invention relates to a process for enriching a synthesis gas containing at least 15 vol % CO in hydrogen and at least 1 ppmv S by using an iron-free water gas shift catalyst.

BACKGROUND OF THE INVENTION

Water gas shift is a well-known method for increasing the hydrogen content of a synthesis gas, this being a gas produced by e.g. steam reforming of a hydrocarbon feed, and which gas contains hydrogen and carbon monoxide. Water gas shift enables increasing the hydrogen yield and decreasing the carbon monoxide content of the synthesis gas according to the equilibrium reaction: $CO+H_2O=CO_2+H_2$.

The synthesis gas used as feed for the water gas shift reaction can be obtained in various ways such as by steam reforming of a hydrocarbon feed gas such as natural gas or naphtha, by partial oxidation of the hydrocarbon feed gas, autothermal reforming, or by gasification of solid carbonaceous materials like biomass, waste or petroleum coke. Such gases can also be obtained as pyrolysis off-gases from thermal decomposition of carbonaceous materials. The CO-content of the synthesis gas varies significantly depending on the feed source and the conditions of synthesis gas preparation. A synthesis gas obtained by e.g. gasification or partial oxidation will most often have a high content of CO. The present invention pertains to such CO-rich gases, with a CO-concentration of 15 vol % or higher. Furthermore, a significant amount of sulfur, at least 1 ppmv, is present, such as 15 ppmv, 250 ppmv, or 5 vol % sulfur.

Normally, the hydrogen yield is optimized by conducting the exothermic water gas shift in separate reactors, such as separate adiabatic reactors with inter-stage cooling. Often, the first reactor is a high temperature shift (HTS) reactor having arranged therein a HTS catalyst, and the second reactor is a low temperature shift (LTS) reactor having arranged therein a LTS catalyst. A medium temperature shift (MTS) reactor may also be included or it may be used alone or in combination with a HTS reactor or with a LTS reactor. Typically, HTS reactors are operated in the range 300-570° C. and LTS in the range 180-240° C. The MTS reactor operates normally in the temperature range of 210-330° C.

The market predominant established type of HTS catalyst is an Fe-based catalyst, typically an iron/chromium (Fe/Cr) based with minor amounts of other components typically including copper. However, when operating with CO-rich gases, the Fe-based catalyst is liable to over-reduction, thus forming undesired iron carbides: Fe-based HTS catalysts have an inherent problem when operated in a synthesis gas with a high content of carbon monoxide and/or a low oxygen to carbon ratio. This is due to the potential for over-reduction of the catalyst leading to its full or partial transformation to iron carbides or elemental iron, which causes decreased selectivity (increased hydrocarbon formation) and loss of mechanical strength of the shaped catalyst, which may lead to increased pressure drop over the reactor. This matter has been discussed in detail in [L.

Lloyd, D. E. Ridler and M. V. Twigg Ch. 6, 283-339 in M. V. Twigg (ed.) Catalyst Handbook 2nd ed. Manson Publishing, Frome, England 1996] and in [P. E. Højlund-Nielsen and J. Bøgild-Hansen "Conversion limitations in hydrocarbon synthesis", Journal of Molecular Catalysis 17 (1982), 183-193].

To overcome these problems, U.S. Pat. No. 9,365,421 for instance, discloses a reactor design where some of the shifted synthesis gas is recycled to the inlet of the water gas shift reactor, thereby diminishing the carbon monoxide concentration. This allows for the use of an iron-based catalyst, but increases the capital expenses (Capex) and operating expenses (Opex) of the plant where it is used.

U.S. Pat. No. 7,510,696 solves the problem of avoiding over-reduction of a Fe-based shift catalyst differently, namely by adding an oxidant gas to the feed to the water gas shift reactor.

Applicant's U.S. Ser. No. 10/549,991 discloses the recycling of product gas in order to operate the water gas shift reactors in a way that can handle aggressive and reactive synthesis gas, such as a gas having a high content of CO and $H_2$.

Applicant's US 2019039886 A1 discloses an ATR-autothermal reformer based ammonia process and plant. A synthesis gas is produced by reforming which comprises e.g. about 27 vol. % CO and shifted in a high temperature shift utilizing a promoted zincaluminum oxide catalyst (HTS catalyst) at a steam to carbon ratio in the reforming of less than 2.6. More specifically, the HTS catalyst comprises in its active form a Zn/Al molar ratio in the range 0.5 to 1.0 and a content of alkali metal in the range 0.4 to 8.0 wt % and a copper content in the range 0-10% based on the weight of oxidized catalyst. This citation is at least silent about providing a gas feed to the shift step which contains sulfur.

Applicant's US 2010000155 A1 discloses a chromium-free water gas shift catalyst, in particular a HTS catalyst comprising in its active form a mixture of zinc alumina spinel and zinc oxide in combination with an alkali metal selected from the group consisting of Na, K, Rb, Cs and mixtures thereof, the catalyst having a Zn/Al molar ratio in the range 0.5 to 1.0 and a content of alkali metal in the range 0.4 to 8.0 wt % based on the weight of oxidized catalyst. The synthesis gas to the HTS contains is said to normally contain 5-50 vol % CO. The HTS catalyst is tolerant against impurities such as sulfur present in low concentrations, i.e. up to 0.4 ppm $H_2S$. In Example 28, the catalyst, having a density of 1.8 g/cm$^3$ is exposed to 10% $H_2S$ in order to sulfidize the catalyst; thus this $H_2S$ is not part of the gas being fed when conducting the water gas shift. This citation is therefore also at least silent about providing a gas to the shift step which contains a significant amount of sulfur, i.e. significantly higher than 0.4 ppm $H_2S$.

Applicant's EP 2300359 B1 discloses a process for operating a HTS reactor operating at conditions in which the synthesis gas entering the reactor has a specific range of oxygen to carbon molar ratio (0/C-ratio) of 1.69 to 2.25. The catalyst comprises in its active form a mixture of zinc alumina spinel and zinc oxide in combination with a promoter in the form of an alkali metal selected from the group consisting of Na, K, Rb, Cs and mixtures thereof, said catalyst having a Zn/Al molar ratio in the range 0.5 to 1.0 and a content of alkali metal in the range 0.4 to 8.0 wt % based on the weight of oxidized catalyst, with the catalyst, having a density of 1.8 g/cm$^3$. The synthesis gas to the HTS contains is said to normally contain 5-50 vol % CO. This citation is at least silent about providing a feed gas to the shift step which contains sulfur.

US 2006002848 A1 discloses a process for conducting an equilibrium limited chemical reaction in a single stage process channel. The process is suitable for conducting a water-gas shift reaction with a catalyst comprising copper, zinc and aluminium, and with a feed gas having a high content of CO, i.e. 1-20 mol % CO. This citation is at least silent about providing a feed gas to the shift step which contains sulfur.

SUMMARY OF THE INVENTION

It is therefore an object of the present invention to provide a process for the operation of water gas shift conversion which in a simple manner overcomes the above problems of over-reduction of Fe-based water gas shift catalysts.

It is another object of the present invention to provide a superior water gas shift conversion process, in particular a HTS process, which is capable of tolerating feed gases with a high content of not only CO, but also sulfur, such as $H_2S$.

It is yet another object of the present invention to provide a water gas shift conversion process, in particular a HTS process, which is simpler and thereby less expensive than prior art processes.

These and other objects are solved by the present invention.

Accordingly, the invention is a process for enriching a synthesis gas in hydrogen by contacting said synthesis gas with a water gas shift catalyst, said synthesis gas being a CO-rich synthesis gas comprising at least 15 vol % CO and at least 1 ppmv, such as 15 ppmv, 250 ppmv, or 5 vol % sulfur, the water gas shift catalyst comprising Zn, Al, optionally Cu, and an alkali metal or alkali metal compound, said water gas shift catalyst being free of chromium (Cr) and iron (Fe), and wherein the water gas shift catalyst has a pore volume, as determined by mercury intrusion, of 240 ml/kg or higher, such as 250 ml/kg or higher, such as 240-380 ml/kg or 300-600 ml/kg.

The mercury intrusion is conducted according to ASTM D4284.

For the purposes of the present application, unless otherwise stated, the percentages of a given compound or combination of compounds in a gas, are given on a volume and wet basis. For instance, 15 vol % CO means 15 vol % on a wet basis.

As used herein, the term "free of chromium (Cr) and free of iron (Fe)" means that the content of Fe is less than 1 wt % or the content of Cr is less than 1 wt %. For example, the content of Fe of Cr is not detectable.

In an embodiment, the synthesis gas comprises 1 ppmv to 5 vol % sulfur.

As used herein, sulfur means $H_2S$ and/or COS, i.e. it is assumed that sulfur is present as $H_2S$, COS or a combination thereof. Although the synthesis gas may have been subjected to desulfurization, e.g. by passing over a ZnO guard, there is an equilibrium slip of sulfur from such guard. The type of catalyst used in the process of the present invention not only is capable of handling CO-rich gases, but is also tolerant towards exposure to sulfur and can be used also in sulfur containing gases.

This represents a great advantage since the alkali-promoted Zn—Al oxide catalysts used in the process of the invention are much less costly than the Co—Mo based catalysts i.e. sour shift catalysts normally used for conducting the water gas shift reaction in the presence of sulfur compounds.

Accordingly, the present invention turns out to not only eliminate issues related to catalyst over-reduction, but also the need of using expensive CoMo catalysts, or adapting expensive and cumbersome process schemes involving recycles and dilutions as disclosed in the prior art. A superior process is thereby provided.

CO-rich gases will often contain sulfur. It is therefore of significance, that surprisingly, the catalyst used for the process of the invention when exposed to a synthesis gas containing a significant amount of sulfur, for instance 15 ppmv $H_2S$, retained a high portion of its initial activity, e.g. more than 70% of its initial activity after 445 hours of operation at 380° C. Furthermore, the deactivation did not follow a linear path but was most pronounced in the beginning of the experiment. Thus, an exponential deactivation model with very good fit to data indicated a residual activity of 48% of the initial activity. This means that even after longer periods of time, such after several years exposure to the synthesis gas containing 15 ppmv sulfur, the catalyst would still have 48% of its initial activity.

A particular property of such gas containing a high amount of CO and S, i.e. at least 15 vol % CO and at least 1 ppmv, such as 15 ppmv, 250 ppmv, or 5 vol % sulfur, is the higher equilibrium content of COS. Equilibrium calculations show that the COS/$H_2S$ ratio increases from 0 to 0.0128 (300° C., 25 bar) in a CO/$H_2O$ gas going from 100 vol. % $H_2O$ to 50/50 CO/$H_2O$. This ratio is independent of the total sulfur content in the gas. Hence, the content of COS increases in a gas containing CO, $H_2O$ and S with increasing content of CO.

Recently, other chromium-free HTS catalysts such as accounted for in e.g. [M. Zhu and I. E. Wachs *Catalysis Today* 311 (2018), 2-7], have appeared, but they are based on iron as the active metal and therefore suffers the same problems regarding selectivity and mechanical strength as the Fe/Cr and Cu/Fe/Cr catalysts. Furthermore, the CO-rich synthesis gas used as feed for the HTS catalyst will often, as mentioned earlier, contain sulfur, which leads to catalyst deactivation. As recited above, the catalysts of the present invention are not highly sensitive to sulfur poisoning at the relevant operating temperatures. For high temperature shift, the operating temperature is typically within the range 300-570° C. or 300-550° C.

The present invention enables a process for enriching such CO-rich synthesis gases in hydrogen by means of the water gas shift reaction using an iron-free catalyst and which also is chromium-free.

A more sustainable and environmentally friendly process is thereby also provided, as the catalyst is free of Cr. Furthermore, by the catalyst also being free of Fe, undesired formation of hydrocarbons in the process such as methane, is significantly reduced or even eliminated.

It has also been found, that the catalysts of the present invention are more heat resistant and do not risk overly loss of mechanical strength due to over-reduction. Therefore, the invention enables running the water gas shift process both with less risk of developing pressure drop over the HTS reactor and with the possibility of operating at lower recycle rates or even without recycling, than when operated with an Fe-based catalyst. The invention thus gives potential for economic advantages compared to current state of the art processes.

It is well-known that Fe-based catalysts, for instance Fe/Cr catalyst, as well as Zn—Al based catalysts both have a spinel structure and are prompt to reduction. Thus, it is well known that ZnO, when exposed at temperatures of 500° C. or higher, for instance 550° C., 570° C. or 600° C., even in air becomes oxygen vacant, i.e. is transformed from ZnO to $ZnO_{1-x}$. Yet unexpectedly it has been found that the catalyst is thermally stable at these temperatures.

By the term "thermally stable" is meant that the space-time yield (STY) in mol/kg/h as a function of time on stream of the catalyst is practically unchanged, e.g. within 5%, for most of the time on stream, e.g. 70% or more of the time.

In addition, by the present invention a more robust process is achieved due to a higher tolerance towards exposure to a synthesis gas with a low oxygen/carbon ratio compared to when for instance using an Fe/Cr catalyst. By the term "low oxygen/carbon ratio" is meant a highly reducing gas with a low molar O/C-ratio, i.e. 1.5 or lower. The O/C-ratio is calculated as $O/C=([CO]+2*[CO_2]+[H_2O])/([CO]+[CO_2])$.

The process of the invention, particularly for HTS, is capable of tolerating of a lower steam/dry gas in the feed gas (synthesis gas) than prior art processes using e.g. Fe/Cr catalysts, thereby providing low risk in catalyst damage to create pressure drop issues. This means that it is also possible to operate with a lesser percentage recirculation or even no recirculation, giving a better economy by reducing capital and operating expenses. It would be understood, that lower steam/dry gas means accordingly lower O/C ratio.

The water gas shift catalyst has a pore volume, as determined by mercury intrusion, of of 240-380 ml/kg or 250-380 ml/kg or 300-600 ml/kg. Apart from the catalyst having these pore volumes enabling to cope with variable gas feeds rich in CO and sulfur, the use of these pore volumes enable to operate the HTS reactor also in transient state, e.g. during start up, with reduced or no leaching of alkali metal or alkali metal compounds. Thereby, the water gas shift catalyst will not lose activity to any significant degree, for instance by virtue of the alkali or alkali metal compound no longer being present.

In another embodiment, the pore volume is in the range 300-500 ml/kg, for instance 300, 350, 400, 450 or 500 ml/kg, or withing the range 320-430 ml/kg, as measured by mercury intrusion.

In an embodiment, the water gas shift catalyst is a high temperature shift (HTS) catalyst and the water gas shift reactor is a HTS reactor operating at a temperature in the range of 300-570° C., and optionally also at a pressure in the range 2.0-6.5 MPa.

A synthesis gas converted over a HTS catalyst according to the invention may be converted further to optimize the hydrogen yield. However, it may also be used directly for the synthesis of important compounds such as methanol, dimethyl ether, olefins or aromatics or it may be converted to hydrocarbon products, i.e. synthetic fuels (synfuels) in a Fisher-Tropsch (FT) synthesis or other chemical synthesis processes.

According to the present invention, a simple HTS reactor, preferably an adiabatic HTS-reactor without recycle, can be used even for CO-rich gases comprising at least 15 vol % CO, for instance at least 20 vol % CO, such as at least 40 vol % CO, or higher, for instance 50 vol % or 60 vol %, provided that the catalyst is of the Zn/Al-type with appropriate composition and appropriate content of promoters such as copper and alkali metal compounds, as recited in any of the above or below embodiments.

In an embodiment, the CO-rich synthesis gas comprises at least 20 vol % CO, but no more than 60 vol % CO or no more than 50 vol % CO. For instance, the CO-content can be 25 vol %, 30 vol %, 40 vol %, 45 vol % or 50 vol %. The upper limit of the CO-concentration is suitably 50 vol %, which can be a stoichiometric gas according to the water gas shift reaction containing 50 vol % CO and 50 vol % $H_2O$.

In a particular embodiment, the CO-rich synthesis gas comprises: CO 30-60 vol % $H_2O$ 30-50 vol % $CO_2$ 0-5 vol % $H_2$ 0-20 vol %.

In an embodiment, the process further comprises a step for producing said synthesis gas, said step being any of:

steam reforming (i.e. steam methane reforming, SMR) of a hydrocarbon feed gas such as natural gas or naphtha, for instance by electric heated reforming (e-SMR);

partial oxidation of the hydrocarbon feed gas;

autothermal reforming (ATR) of the hydrocarbon feed gas;

thermal decomposition of a carbonaceous material including gasification or pyrolysis of a solid carbonaceous material such as: petroleum coke, or a renewable feedstock comprising biomass and/or waste;

combinations thereof, such as by combining e-SMR and ATR.

The above technologies are well known in the art. For details on e-SMR, which is a more recent technology, reference is given to applicant's WO 2019/228797 A1.

In a particular embodiment, the thermal decomposition is hydrothermal liquefaction. In another particular embodiment, the thermal decomposition is pyrolysis. In another particular embodiment, the thermal decomposition is gasification. Accordingly, in another particular embodiment, the synthesis gas is a pyrolysis off-gas from the thermal decomposition of a solid renewable feedstock. In yet another particular embodiment, the the solid renewable feedstock is:

a lignocellulosic biomass including: wood products, forestry waste, and agricultural residue; and/or municipal waste, i.e. municipal solid waste, in particular the organic portion thereof.

As used herein, the term "thermal decomposition" shall for convenience be used broadly for any decomposition process, in which a material is partially decomposed at elevated temperature (typically 250° C. to 800° C. or even 1000° C.), in the presence of substoichiometric amount of oxygen (including no oxygen). The product will typically be a combined liquid and gaseous stream, as well as an amount of solid char. The term shall be construed to include processes known as pyrolysis and hydrothermal liquefaction, both in the presence and absence of a catalyst.

As used herein, "thermal decomposition" also comprises gasification, i.e. a gasification process. It would be understood, that while pyrolysis is conducted in the absence of air, gasification is conducted in the presence of air.

As used herein, the term "lignocellulosic biomass" means a biomass containing, cellulose, hemicellulose and optionally also lignin. The lignin or a significant portion thereof may have been removed, for instance by a prior bleaching step. The lignocellulosic biomass is forestry waste and/or agricultural residue and comprises biomass originating from plants including grass such as nature grass (grass originating from natural landscape), wheat e.g. wheat straw, oats, rye, reed grass, bamboo, sugar cane or sugar cane derivatives such as bagasse, maize and other cereals.

As used herein, the term "municipal solid waste" means trash or garbage thrown away as everyday items from homes, school, hospitals and business. Municipal solid waste includes packaging, newspapers, clothing, appliances, and food rests.

In another embodiment, the process comprises adding steam to the synthesis gas. Thereby the WGS reaction is shifted towards yielding more hydrogen.

In an embodiment, the water gas shift catalyst is a Zn/Al-based catalyst comprising in its active form a mixture of zinc aluminum spinel and optionally zinc oxide in combination with an alkali metal compound selected from K, Rb, Cs, Na, Li and mixtures thereof, in which the Zn/Al molar ratio is in the range 0.3-1.5 and the content of alkali metal compound is in the range 0.3-10 wt % based on the weight of oxidized catalyst.

In an embodiment, the water gas shift catalyst comprises only, i.e. consists of, Zn, Al, optionally Cu, and an alkali metal or alkali metal compound.

This type of HTS catalyst usually also contains copper as another promoter. This type of HTS catalyst. i.e. a Cu-promoted HTS catalyst, is described in e.g. applicant's patents U.S. Pat. No. 7,998,897 B2, U.S. Pat. No. 8,404,156 B2 and U.S. Pat. No. 8,119,099 B2. The catalyst of the process of the present invention differs with respect to such catalysts at least in that the pore volume is 240 ml/kg or higher, such as 250 ml/kg or higher, for instance 240-380 ml/kg or 250-380 ml/kg or 300-600 ml/kg, thereby enabling to cope with variable gas feeds rich in CO and sulfur coming from e.g. gasification processes without the need to resort to expensive sour-shift catalysts.

In an embodiment, the Zn/Al molar ratio is in the range 0.5-1.0 and the content of alkali metal is in the range 0.4-8 wt % based on the weight of oxidized catalyst.

In an embodiment, the content of alkali metal, preferably K, is in the range 1-6 wt %, such as 1-5 wt % or 2.5-5 wt %. In particular, with the latter range, HTS operation shows an alkali-buffer effect so that even when some alkali is leached or lost during the HTS operation, this being start-up or normal operation, the catalytic activity is maintained or even increased.

In an embodiment, the content of Cu is in the range 0.1-10 wt %, such as 1-5 wt %, based on the weight of oxidized catalyst.

In an embodiment, the water gas shift catalyst is in the form of a pellets, extrudate, or tablet, and wherein the particle density is 1.25-1.75 g/cm$^3$ or 1.55-18.85 g/cm$^3$, for instance 1.3-1.8 g/cm$^3$, or for instance 1.4, 1.5, 1.6, 1.7 g/cm$^3$. The lower the particle density the higher the pore volume. The term "particle" means a pellet, extrudate, or tablet, which e.g. have been compactified e.g. by pelletizing or tableting from a starting catalyst material, for instance from a powder into said tablet. The density is measured by simply dividing the weight of e.g. the tablet by its geometrical volume.

Normally, the density of the catalyst particles, for instance a HTS catalyst such as in applicant's U.S. Pat. No. 7,998,897 or U.S. Pat. No. 8,404,156 is close to 2 g/cm$^3$, for instance up to 2.5 g/cm$^3$ or about 1.8 or 1.9 g/cm$^3$. These relatively high densities contribute significantly to the mechanical strength of the particles, e.g. tablets, so that these can withstand the impact when for instance loading the HTS reactor from a significant height, for instance 5 m. Thus, having a high particle density, for instance 1.8 g/cm$^3$ or higher, is normally desired. It has now also been found that by compactifying e.g. tableting to a less dense shape, the pore volume of the particles is increased thereby solving the leaching problems addressed above, yet at the same time the particles maintain a mechanical strength which is adequate for resisting impact upon loading or during normal operation, as well as avoiding increased pressure drop over the reactor during normal operation (continuous operation) due to particles being crushed.

In an embodiment, the catalyst is in the form of pellets, extrudates or tablets, and the mechanical strength is in the range ACS: 30-750 kp/cm$^2$, such as 130-700 kp/cm$^2$ or kp/cm$^2$. ACS is an abbreviation for Axial Crush Strength. Alternatively, the mechanical strength measured as SCS is in the range 4-100 such as 20-90 kp/cm or 40 kp/cm. SCS is an abbreviation for Side Crush Strength, also known as Radial Crush Strength. For a given tablet density, the mechanical strength can vary considerably depending on the machinery used for compactifying the catalyst powder. The lower ranges of mechanical strength (ACS or SCS), for instance up to ACS: 300 or 350 kp/cm$^2$ or up to SCS: 40 kp/cm, correspond to those obtained with a small (around 100 g/h) hand-fed tablet machine, a so-called Manesty machine. The upper ranges of mechanical strength, for instance up to ACS: 750 kp/cm$^2$ or up to SCS: 90 kp/cm, correspond to those obtained using an automated full-scale device (100 kg/h) such as a Kilian RX machine with rotary press. ACS and SPS are measured in the oxidized form of the catalyst. Further, the mechanical strength is measured according to ASTM D4179-11.

In an embodiment, the process further comprises contacting a first shifted gas i.e. a hydrogen enriched synthesis gas, withdrawn from said HTS reactor, with a medium temperature shift (MTS) catalyst in a MTS reactor or a low temperature shift (LTS) catalyst in a LTS reactor. A further hydrogen enriched synthesis gas is thereby obtained. Suitably, the hydrogen enriched synthesis gas is passed to a $CO_2$-removal section e.g. amine absorber, and hydrogen purification e.g. in a Pressure Swing Adsorption unit (PSA unit) for providing a hydrogen product.

The water gas shift reactor, may also serve as a reverse water gas shift reactor, whereby a feed gas rich in hydrogen and carbon dioxide is converted to carbon monoxide and water according to the reverse water gas shift reaction: $CO_2+H_2=CO+H_2O$. With the catalysts used for the process of the present invention, high CO-concentrations can be allowed in the exit gas of the reverse water gas shift reactor, which is not possible with an Fe-based catalyst.

It is also well known that iron containing catalysts need to operate above a certain steam/carbon molar ratio in the synthesis gas entering a HTS reactor or above a certain oxygen/carbon molar ratio, in order to prevent formation of iron carbides and/or elemental iron, which may lead to severe loss of mechanical strength and accordingly to increased pressure drop over the reactor. The alkali-containing Zn/Al-based catalysts are not sensitive to the oxygen/carbon molar ratio and do not lose mechanical strength as a result of a low steam content in the CO-rich synthesis gas being fed to the HTS reactor during normal operation.

Advantages of the invention include:

- a process for particularly HTS that is capable of coping with the variable gas feeds (synthesis gas) that come with e.g. gasification and which present a high content of not only CO (at least 15 vol %), but also sulfur (at least 1 ppmv);
- a process particularly for HTS that is capable of tolerating of a lower steam/dry gas in the feed gas (synthesis gas) thereby providing low risk in catalyst damage to create pressure drop issues. This means that it is also possible to operate with a lesser percentage recirculation or even no recirculation, giving a better economy by reducing capital and operating expenses. It would be understood, that the lower steam/dry gas means accordingly lower O/C ratio;

a process for particularly HTS that obviates the use of expensive CoMo catalysts to deal with the sulfur in the feed gas.

BRIEF DESCRIPTION OF THE DRAWING

The accompanying sole FIGURE shows a plot of the thermal stability of Catalyst A during high shift operation of Example 2.

DETAILED DESCRIPTION

Examples

Example 1. Preparation of Catalyst A—According to Invention Embodiment

The catalyst was prepared according to the procedure given in applicants patent U.S. Pat. No. 7,998,897 Example 1 by adjusting the composition. According to ICP analysis, Catalyst A contains 1.99 wt % K, 1.65 wt % Cu, 34.3 wt % Zn, 21.3 wt % Al. Accordingly, the Zn/Al molar ratio is 0.665. The catalyst was shaped as 6×6 mm tablets. Furthermore, there is provided a pore volume (PV) of about 320 ml/kg and tablet density, as measured by simply dividing the weight of the tablet by its geometrical volume, of 1.7 g/$cm^3$.

Example 2. Thermal Stability of Catalyst A

The test was carried out in a tubular reactor (ID 19 mm) heated by three external electrical heaters. 40 g of tablets of catalyst A was loaded. The gas composition was 9.4 vol % CO, 37.6 vol % $H_2O$, 6.1 vol % $CO_2$, 45 vol % $H_2$, 1.9 vol % Ar. The experiments were conducted at 2.35 MPa. The duty of the three external electrical heaters was adjusted, so as to obtain almost isothermal conditions. The catalyst bed temperature was measured by 10 internal thermoelements and the difference between the inlet temperature and the exit temperature was always less than 2° C. The concentration of all components was regularly measured in both inlet and dry exit gas by GC (calibrated towards a gas mixture of known composition). All measurements were carried out at 397° C. (exit temperature) at a gas hourly space velocity GHSV=20000 Nl/kg/h. Catalyst ageing (in between measurements) was done by maintaining all operational parameters except the temperature, which was raised to 570° C. The activity at 397° C. expressed as space-time yield (STY) in mol/kg/h as a function of time on stream is shown in the accompanying FIGURE. It is clearly seen that after an initial decline in activity the catalyst stabilizes after 400-600 hours and is practically unchanged for the remaining duration of the test.

In this example the ageing temperature of 570° C. was obtained by external heating instead of by using a CO-rich gas, i.e. the example represents the thermal exposure which results from using a CO-rich gas. This was done because the experimental setup allowed for much better temperature control this way. A temperature of 570° C. would be reached in the exit of an adiabatic rector by equilibrating a CO-rich gas with the composition 35 vol % CO, 45 vol % $H_2O$, 5 vol % $CO_2$ and 15 vol % $H_2$ with an inlet temperature of around 350° C.

Example 3. Tolerance Towards Dry Synthesis Gas

As a test for the tolerance towards low oxygen/carbon ratio, Catalyst A was exposed to dry synthesis gas for 1.4 hour. A dry synthesis gas is a highly reducing gas having no $H_2O$ and with a low molar O/C-ratio, i.e. 1.5 or lower. The dry synthesis gas according to the present example had the composition 47.5 vol. % $H_2$, 45.7 vol. % CO, 4.8 vol. % $CO_2$, 2.0 vol. % Ar, with an oxygen/carbon (0/C) ratio of 1.10. This exposure was induced after 49 hours of operation in a normal (wet) synthesis gas. The pressure drop over the reactor, ΔP, was measured before and after the exposure. Before and after the exposure, 120 Nl/h of normal (wet) synthesis gas was fed, having the composition 29.7 vol % $H_2$, 28.6 vol % CO, 3.0 vol % $CO_2$, 1.3 vol % Ar and 37.5 vol % $H_2O$, with an O/C ratio of 2.28. The pressure at the reactor outlet was controlled by a back-pressure regulator with a setpoint of 5.07 MPa. The evolution of the pressure difference ΔP between the outlet and the inlet of the reactor, measured after exposure to the dry synthesis gas and again operating in the wet synthesis gas with O/C=2.28, was followed. It was found that the pressure drop is very small, less than 0.5 bar, and almost the same before and after exposure to the dry synthesis gas.

Example 4. Comparative

A Cu-promoted Fe/Cr catalyst (Catalyst B) was submitted to the same test as described in Example 3, the only difference being that the exposure to dry synthesis gas was induced 73 hours after normal operation. The increase in pressure drop after exposure to the dry synthesis gas was found to be substantial, approximately 15 bar.

Clearly, the tolerance towards the low O/C synthesis gas is very high for Catalyst A while it is very low for Catalyst B, the Cu-promoted Fe/Cr catalyst.

The invention claimed is:

1. A process for enriching a synthesis gas in hydrogen by contacting said synthesis gas with a water gas shift catalyst in a water gas shift reactor, said synthesis gas being a CO-rich synthesis gas comprising at least 15 vol % CO and at least 1 ppmv sulfur, the water gas shift catalyst comprising Zn, Al, optionally Cu, and an alkali metal or alkali metal compound, said water gas shift catalyst being free of chromium (Cr) and iron (Fe), and wherein the water gas shift catalyst has a pore volume, as determined by mercury intrusion, of 240 ml/kg or higher.

2. The process according to claim 1, wherein the water gas shift catalyst is a high temperature shift (HTS) catalyst and the water gas shift reactor is a HTS reactor operating at a temperature in the range of 300-570° C., and optionally also at a pressure in the range 2.0-6.5 MPa.

3. The process according to claim 2, wherein the HTS reactor is an adiabatic HTS-reactor without recycle.

4. The process according to claim 1, wherein the CO-rich synthesis gas comprises at least 20 vol % CO but no more than 60 vol % CO.

5. The process according to claim 4, wherein the CO-rich synthesis gas comprises:

CO 30-60 vol %;

$H_2O$ 30-50 vol %;

$CO_2$ 0-5 vol %; and $H_2$ 0-20 vol %.

6. The process according to claim 1, further comprising a step for producing said synthesis gas, said step being any of:

steam reforming of a hydrocarbon feed gas;

partial oxidation of the hydrocarbon feed gas;

autothermal reforming (ATR) of the hydrocarbon feed gas;

thermal decomposition of a carbonaceous material including gasification or pyrolysis of a solid carbonaceous material;

combinations thereof.

7. The process according to claim 1, wherein the water gas shift catalyst is a Zn/Al-based catalyst comprising in its active form a mixture of zinc aluminum spinel and optionally zinc oxide in combination with an alkali metal compound selected from K, Rb, Cs, Na, Li and mixtures thereof, in which the Zn/Al molar ratio is in the range 0.3-1.5 and the content of alkali metal compound is in the range 0.3-10 wt % based on the weight of oxidized catalyst.

8. The process according to claim 1, wherein the water gas shift catalyst comprises only Zn, Al, optionally Cu, and an alkali metal or alkali metal compound.

9. The process according to claim 1, wherein the Zn/Al molar ratio is in the range 0.5-1.0 and the content of alkali metal is in the range 0.4-8 wt % based on the weight of oxidized catalyst.

10. The process according to claim 1, wherein the content of alkali metal is in the range 1-6 wt %.

11. The process according to claim 1, wherein the content of Cu is in the range 0.1-10 wt %, based on the weight of oxidized catalyst.

12. The process according to claim 1, wherein the water gas shift catalyst is in the form of pellets, extrudates, or tablets, and wherein the particle density is 1.25-1.75 $g/cm^3$, as measured by dividing the weight of the catalyst by its volume.

13. The process according to claim 1, wherein the catalyst is in the form of pellets, extrudates or tablets, and wherein the mechanical strength is in the range ACS: 30-750 $kp/cm^2$, or SCS: 4-100 kp/cm, wherein ACS and SPS are measured in the oxidized form of the catalyst, and according to ASTM D4179-11.

14. The process according to claim 1, wherein said synthesis gas comprises at least 15 ppmv sulfur.

15. The process according to claim 1, wherein said synthesis gas comprises at least 5 vol % sulfur.

16. The process according to claim 1, wherein the water gas shift catalyst has a pore volume, as determined by mercury intrusion, of 250 ml/kg or higher.

17. The process according to claim 1, wherein the water gas shift catalyst has a pore volume, as determined by mercury intrusion, of 300-600 ml/kg.

18. The process according to claim 6, wherein said step is a combination of e-SMR and ATR.

19. The process according to claim 10, wherein the content of alkali metal is potassium.

20. The process according to claim 19, wherein the content of potassium is in the range 2.5-5 wt %.

* * * * *